United States Patent

[11] 3,615,630

[72] Inventor Roland Dietrich
Wiesbaden-Biebrich, Germany
[21] Appl. No. 773,971
[22] Filed Nov. 6, 1968
[45] Patented Oct. 26, 1971
[73] Assignee Kalle Aktiengesellschaft
Wiesbaden-Biebrich, Germany
[32] Priorities Nov. 9, 1967
[33] Germany
[31] P 15 97 626.8;
June 29, 1968, Sweden, No. 8877/68

[54] LIGHT-SENSITIVE COATING AND RECORDING MATERIAL CONTAINING PHOTOPOLYMERIZABLE COMPOUNDS
18 Claims, No Drawings

[52] U.S. Cl. .......... 96/115 P, 96/35.1, 96/86 P, 117/34, 204/159.22, 260/396 N
[51] Int. Cl. .......... G03c 1/68
[50] Field of Search .......... 96/86, 115, 35.1; 117/34; 260/396 N; 204/159.22

[56] References Cited

UNITED STATES PATENTS

| | | | |
|---|---|---|---|
| 3,024,180 | 3/1962 | McGraw | 96/115 X |

FOREIGN PATENTS

| | | | |
|---|---|---|---|
| 870,907 | 6/1961 | Great Britain | 260/396 |
| 1,193,366 | 5/1965 | Germany | 96/115 |

OTHER REFERENCES

Chem Abstracts, 1958, Vol. 52, Col 18332

*Primary Examiner*—William D. Martin
*Assistant Examiner*—Mathew R. P. Perrone
*Attorney*—James E. Bryan

ABSTRACT: This invention relates to a light-sensitive mixture comprising one or more photopolymerizable compounds and, if desired, a binder, conventional sensitizers, dyestuffs and polymerization inhibitors, and to a recording material prepared by coating a support with the mixture, the mixture including, in addition to other ethylenically unsatured photopolymerizable compounds which may be present, at least one ethinyl quinole.

LIGHT-SENSITIVE COATING AND RECORDING MATERIAL CONTAINING PHOTOPOLYMERIZABLE COMPOUNDS

The present invention relates to a light-sensitive coating and a recording material containing photopolymerizable compounds which undergo a change in their solubility characteristics and a color reaction under the action of radiation of appropriate wavelength, so that the areas not struck by light can be removed and the material may be used for the production of copies or, after a suitable after-treatment, also for the production of printing plates.

It is known to use coatings applied to a support as recording materials in which coatings a photopolymerization process occurs under the action of light, so that, after imagewise exposure and, if necessary, after removal of the unaltered areas of the layer, a negative image of the original may be obtained.

Normally, ethylenically unsaturated monomers are employed in such materials, which monomers can be easily induced to polymerize either with one another or with other compounds. Both heat rays as well as light in the ultraviolet or the visible range of the spectrum may be used for initiating the polymerization process. Further, for starting the polymerization reaction, initiators are added, i.e. compounds which undergo a change under the action of radiation, viz. decompose into the corresponding reactive fragments, radicals, carbenes and the like, or change over into excited forms capable of attacking ethylenic double bonds. Known initiators of this type are, e.g., ketones, such as benzophenone, benzoin or Michler's ketone, quinones, such as anthraquinone or phenanthrene quinone, peroxides, azides, and the like.

These polymerization processes have the disadvantage that the images produced are often colorless and not directly legible.

Further, the above-mentioned photo initiators have various drawbacks which prevent their universal application, viz. either their activity is not satisfactory so that long exposure times are necessary, or the light-struck areas of the coating are only insufficiently hardened, or they are difficulty soluble and have a strong tendency toward crystallization, so that they are limited in their application and trouble may occur during a prolonged storage of the coatings.

The present invention provides a coating and a recording material which is substantially free from the disadvantages mentioned above and yields directly legible images.

The present invention is concerned with a light-sensitive mixture containing one or more photopolymerizable compounds and, if desired, a binder and conventional sensitizers, dyestuffs and polymerization inhibitors, and with a recording material prepared by coating a support with such a mixture. The mixture consists of or contains, besides other known ethylenically unsaturated photopolymerizable compounds which may be present, one or more ethinyl quinoles of the following general formula

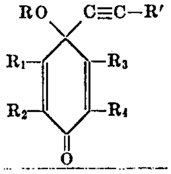

wherein

*R* is *H*, alkyl, aryl or acyl,

R' is H, alkyl, aryl, or the group $-CH=C(H)(OR_5)$ with $R_5$ being alkyl, $R_1$, $R_2$, $R_3$ and $R_4$ are either the same or different and are alkyl or aryl, or $R_1$ and $R_2$ or $R_3$ and $R_4$ may be members of a condensed aromatic ring which may be further substituted by $NH_2$, $NO_2$, OH, $OR_6$ ($R_6$ = alkyl) or Cl, and wherein the alkyl groups are straight-chained or branched alkyls having from one to eight carbon atoms.

A number of compounds according to the invention are listed in the table below. Because of their stability and particularly favorable photopolymerization and photo initiating properties, such quinoles are particularly suitable which are derived from anthraquinone and which contain two conjugated polymerizable groups, e.g. in the form of the eninyl group, such as in particular the compounds corresponding to formulae 1, 2 and 3 of the table. The reproduction coatings prepared with these compounds yield distinctly readable negatives in especially deep colors. But generally, all the compounds of the class of compounds identified above yield good results.

TABLE I

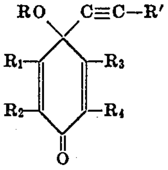

| Compound | R | R' | $R_1$ | $R_2$ | $R_3$ | $R_4$ |
|---|---|---|---|---|---|---|
| 1 | H | $-C(H)=C(H)-OCH_3$ | 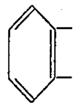 | | 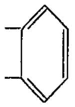 | |
| 2 | H | Same as above | Same as above | | 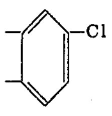 | |
| 3 | H | do. | do. | | 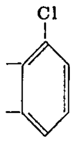 | |
| 4 | H | 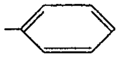 | 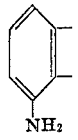 | | 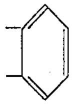 | |

| Compound | R | R' | R1 | R2 | R3 | R4 |
|---|---|---|---|---|---|---|
| 5 | H | Same as above | 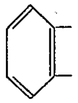 | | Same as above. | |
| 6 | H | $-CH=CH_2$ | Same as above | | Do. | |
| 7 | H | Same as above | do | | H | $-CH_3$ |
| 8 | H | do | 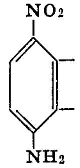 | | 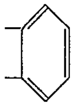 | |
| 9 | H | do | 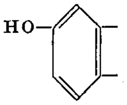 | | Same as above. | |
| 10 | $-CH_3$ | do | 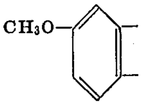 | | Do. | |
| 11 | $-COCH_3$ | do | 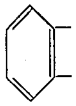 | | Do. | |
| 12 | H | do | Same as above | | 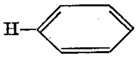 | |
| 13 | H | $C_4H_9$ | do | | 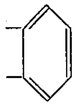 | |
| 14 | H | H | do | | 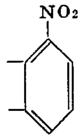 | |
| 15 | H | $-(CH_2)_3CH_3$ | do | | 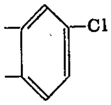 | |

The compounds, which are known per se, are prepared by ethinylation, i.e. the addition of acetylenes or their monosubstitution products, in the form of their alkali salts, to suitable quinones. The reaction takes place in liquid ammonia or in aprotic organic solvents, e.g. dioxane, and yields the quinoles in a single step, which compounds may be further substituted on their OH-group, if desired. (See W. Ried: "Neuere Methoden der praeparativen organischen Chemie," Vol. IV, Aethinierungsreaktionen, Verlag Chemie, Weinheim/Bergstrasse, Germany).

The above-mentioned ethinyl quinoles may be contained in the light-sensitive mixture either as the only photopolymerizable compounds, which has the special advantage that no additional photo initiator is required while directly readable copies can be prepared, or, alternatively, other known ethylenically unsaturated photopolymerizable compounds may be added. It was found that, in the latter case, the proportion of the single components may vary within wide limits, but it is advantageous for the quantity of the ethylenically unsaturated photopolymerizable compound to constitute about 0 to 99 percent by weight, that of the ethinyl quinoles about 0.1 to 75 percent by weight, preferably 1 to 20 percent by weight, and that of the binder about 0 to 90 percent by weight, preferably 0 to 70 percent by weight of the total weight of the layer, with small proportions of such additives as known sensitizers, polymerization inhibitors and the like being added in the normal quantities of about 0.0001 to 5 percent by weight. When no ethylenically unsaturated photopolymerizable compounds are present, the proportion of the ethinyl quinoles is from about 20 to 80 percent by weight, with 80 to 20 percent by weight of binder.

All substances known to be suitable for this purpose may be used as ethylenically unsaturated photopolymerizable compounds, in particular acrylamides, e.g. N-tert.-butyl acrylamide, diaceton acrylamide, N,N'-methylene-bis-acrylamide, N,N-hexamethylene-bis-acrylamide, and the like; methacrylamides, e.g. N-n-butylmethacrylamide, isobutylidene-bis-methacrylamide, N,N'-ethylene-bis-methacrylamide, N,N'-hexamethylene-bis-methacrylamide; acrylates, e.g. butyl acrylate, glycidyl acrylate, octyl-acrylate, ethyleneglycol diacrylate, triethyleneglycol diacrylate, polyethylene-glycol diacrylate, trimethylol-propane-triacrylate, neopentylglycol-dimethacrylate, trimethylol-propane-trimethacrylate and others; vinyl ethers, vinyl esters, allyl compounds and vinyl halides, such as vinyl chloride.

The esters and amides of acrylic acid which contain the unsaturated group at least twice, constitute a particularly preferred group of polymerizable monomers which may be incorporated in the coatings.

The ethinyl quinoles combine the function of a photopolymerizable compound with that of a photoinitiator. They are superior to other known compounds in that they dissolve easily in organic solvents, do not tend to crystallize, and in some cases even have film-forming properties, so that they may be added to the layers in relatively large quantities. As can be seen from the following examples, their polymerization initiating effect is excellent, so that a liquid monomer is completely polymerized within a few seconds. Since the compounds constitute photoinitiator and monomer in one molecule, they are capable of starting their own polymerization, so that the polymers formed are not copolymers but homopolymers. This has the advantage that these compounds may be employed without further initiators or sensitizers. Since the polymers formed are colored, as already mentioned, distinctly visible images are produced which considerably facilitates further processing.

All substances known from the respective industry may be used as binders, such as in particular cresol and/or phenol-formaldehyde condensation products, preferably the so-called novolaks (e.g. Alnovol, a product of Chemische Werke Albert, Wiesbaden-Biebrich, Germany). It seems advisable to use a binder which contains acid groups, so that the layer is soluble in alkaline developers. Copolymers of styrene and maleic anhydride (e.g. Lytron) or polyvinyl acetates containing carboxyl groups (e.g. Mowilith Ct 5), as well as hydrogen phthalates or modified cellulose derivatives may be used. Alternatively, neutral binders may be employed, e.g. polyamides or polyacrylates, in which case an immersion development in a suitable developer will be necessary.

Suitable light sources for initiating the photopolymerization are all the conventional types of arc lamps, mercury vapor lamps, tube exposure devices, xenon lamps, or mixed-light lamps normally used for reproduction purposes, provided their emission of light in the longwave ultraviolet and adjacent visible range of the spectrum is sufficient.

In order to diminish the polymerization-inhibiting effect of molecular oxygen (air), the diffusion of oxygen into the layers may be reduced by a thin top coating of polyvinyl alcohol.

The recording material according to the invention is prepared by methods customary in the reproduction field. The substances are applied in known manner in a solution to which suitable binders, sensitizers, dyestuffs and polymerization inhibitors may be added, if desired, to a support of paper, plastic film or metal foil.

In addition to the manufacture of reproduction material and planographic printing foils, the compounds according to the present invention may be used for the preparation of etching layers, relief-printing forms, printed circuits and the like. Especially in the case of the latter modes of application, it may be of advantage for the light-sensitive coating material to be shipped as such, in the form of a solid or dissolved in a suitable solvent, e.g. ethyl glycol, butyl acetate, methyl ethyl ketone and the like, and to be applied to the selected support only shortly before use.

The following examples further illustrate various embodiments of the invention:

EXAMPLE 1

5 g. of 9-(ω-methoxy-buteninyl)-anthraquinol-9, prepared by ethynylation of anthraquinone with methoxy butenin in liquid ammonia, and 1 g. of a commercial phenol resin (cresol/formaldehyde condensate) are dissolved in a mixture of 320 ml. of acetone and 180 ml. of butyl acetate, and the solution thus prepared is then homogeneously coated onto appropriate supports of mechanically roughened aluminum foil and dried. The aluminum foils are exposed for 5 minutes under a negative original to the light of a commercial mixed-light lamp (e.g. Philips HPR 125 W; distance between the edge of the lamp and the layer: 35 cm.). A directly legible, deep orange-brown negative image is obtained.

The nonimage areas may be easily removed subsequently by means of a weakly alkaline decoating solution (e.g. according to DAS 1,193,366), so that only the thoroughly polymerized image areas are retained. After inking with greasy printing ink, long runs may be obtained on an offset printing machine from a printing foil prepared in this manner, the prints showing an exceptionally accurate screen reproduction.

EXAMPLE 2

250 mg. of 9-(ω-methoxy-buteninyl)-2-chloro-anthraquinol-9, prepared by ethinylation of 2-chloro-anthraquinone with methoxy butenin, are dissolved with 50 mg. of a commercially available maleic acid/styrene copolymerizate in 20 ml. of acetone (containing 20 percent of butyl acetate). A support consisting of an electrolytically roughened aluminum foil (e.g. "Rotablatt") is uniformly coated under subdued light with this solution and then dried with warm air. The thus-sensitized foil is exposed for 4 minutes under a negative original to the light of a xenon lamp normally used in the reproduction field (e.g. "Xenokop". A sharp, deep brown image of the original on a light background is thus obtained. The nonimage areas again can be easily dissolved away with a weakly alcoholic decoating solution (a 1 percent solution of $Na_2SiO_3$ in a mixture consisting of 20 parts by volume of water, 20 parts by volume of methanol, 10 parts by volume of glycol, and 10 parts by volume of glycerol), and, after briefly wiping it with a normal hydrophilizing agent, the finished printing foil may be inked up with greasy ink. In this case also, the printing foil shows an exceptionally good reproduction even of the finest screens.

Similar results are obtained when using 9-methoxy-buteninyl-1-chloro-anthraquinol(9) instead of the 2-chlor-isomer.

EXAMPLE 3

In an otherwise identical process, 9-phenethinyl-5-amino-anthraquinol-9 is used as the light-sensitive compound together with a chloroacetic acid-modified phenol-formaldehyde resin, in quantities analogous to those stated in example 1. Exposure was for 5 minutes under a xenon lamp, and a brown-colored, sharp image was obtained on a light yellow background. The printing stencil thus produced substantially corresponds to those obtained by the preceding examples, as regards properties and performance.

Printing stencils which had been prepared using 9-buteninyl-2-hydroxy-anthraquinol or 1-buteninyl-2-methyl-naphthoquinol(1) were of almost identical quality.

EXAMPLE 4

Two hundred fifty mg. of 9(buteninyl-anthraquinol-9are dissolved with 400 mg. of cresol-formaldehyde resin in 25 ml. of acetone, with a butyl acetate content of 20 percent, and the solution is uniformly coated under subdued light to a support consisting of mechanically roughened aluminum as described above. Exposure, development, and processing of the printing plate to make it suitable for printing are performed as described in example 2. In this case, the coloration of the image of the original produced is somewhat weaker than in the preceding cases, but the properties of the reproduction layer correspond to those described in the preceding examples.

EXAMPLE 5

A flat support of an electrically insulating material, e.g. "-Pertinax" (a phenoplast laminate containing a layer of paper) superficially covered with a thin layer of metallic copper, is uniformly coated, in a darkened room, with a sensitizing solution, using a plate whirler rotating at a speed of 120 revolutions per minute. The sensitizing solution is prepared from 0.5 g. of 2-chloro-9(ω-methoxy-buteninyl)-anthraquinol-9 and 0.2 g. of a cresol-formaldehyde polycondensate in 20 ml. of a mixture of acetone and butyl acetate. The sensitized and dried support is exposed, e.g. for 5 minutes to a xenon lamp, under a negative original showing an electrical wiring diagram, and then developed as described above by wiping it over with a weakly alkaline decoating solution in order to remove the nonimage areas. The plate is then rinsed with water, dried, and the bared copper layer is then etched away by means of an etching solution, e.g. a 35 percent solution of ferric chloride. After the plate has again been rinsed with a solvent, if necessary, an excellent track of conductive metal is produced on the support which may be used as a printed circuit.

EXAMPLE 6-methoxy-buteninyl)-anthraquinol-9

A sensitizing solution prepared in the same manner as described in example 5 is coated onto a cleaned zinc plate suitable for one-step etching, and the coated zinc plate is exposed and developed in a manner similar to that described above, using, however, a screen original. A heating step (e.g. for 3 minutes at 180° C.) may follow to harden the layer. In a one-step etching machine, the zinc plate is etched with nitric acid containing a conventional edge-protecting agent. The relief printing plate or block obtained in this manner is distinguished by an excellent adhesion of the layer, even in the areas of fine screen, and may be used for printing long runs, if necessary after residual layer portions have been removed by treatment with a solvent.

EXAMPLE 7

Thirty mg. of 9-phenethinyl-anthraquinol-9 are dissolved in 2 ml. of triethylene glycol diacrylate in a small quartz flask, and the solution is freed from oxygen by introducing nitrogen. While cooling with a small quantity of ice water, the sample is exposed to a carbon arc lamp (150 v., 18 amp., distance of the flask from the edge of the lamp: 35 cm.). After an exposure time of 3 to 5 seconds, the contents of the flask are thoroughly polymerized and solidified.

The test may be repeated analogously, using either o-methyl-9-buteninyl-2-methoxy-anhraquinol(9 ) (No. 10 of table 1), or o-acetyl-9-buteninyl-anthraquinol(9 ) (No. 11 of table 1), or 2-phenyl-1-buteninyl-naphthoquinol(1) (No. 12 of table 1). In these cases, too, the contents of the flask solidify shortly after the beginning of exposure.

EXAMPLE 8

A support consisting of a thin aluminum foil with a mechanically roughened surface is uniformly coated, by means of a plate-whirler customarily used for reproduction purposes, with a solution of the following composition:

400 mg. of a commercial maleic acid/styrene copolymer (e.g. "Lytron") 200 mg. of a copolymer of $\alpha$-methyl-styrene and vinyl toluene ("Picotex")
35 mg. of polyvinyl butyral ("Mowital")
40 mg. of 9-phenethinyl-anthraquinol-9
500 mg. of triethyleneglycol diacrylate
3 mg. of hydroquinone monomethylether, and
9 ml. of methyl ethyl ketone and then dried. A thin top coating of polyvinyl alcohol is then applied.

The thus-sensitized foil is then exposed for 5 minutes to a xenon lamp (380 v., 25 amp.). By wiping briefly with a weakly alkaline developer (1 percent aqueous solution of trisodium phosphate), the nonimage areas of the layer are removed and the support is bared. In order to improve the hydrophilic properties of the support, it may be wiped over with a hydrophilizing agent, and then inked up with printing ink. From the offset printing plate thus obtained, long runs of faultless prints may be produced.

EXAMPLE 9

Sixty mg. of 9-phenethinyl-2-chloroanthraquinol-9, 450 mg. of a polyvinyl acetate containing carboxyl groups ("Mowilith Ct5, 30 mg. of polyvinyl acetate ("Mowilith" 50), 20 mg. of a cellulose acetobutyrate ("Cellit" BP 900), 500 mg. of trimethylol propane triacrylate, and 3 mg. of hydroquinone monomethylether are dissolved in 9 ml. of methyl ethyl ketone, and then coated in the normal manner onto a support consisting of an electrolytically roughened aluminum foil ('-'Rotablatt") and dried.

After the application of a thin top coating of polyvinyl alcohol to inhibit diffusion of oxygen, the foil is exposed for 5 minutes under a screen original to the light of a xenon lamp, as already described, and developed by wiping it with a 3 percent solution of disodium phosphate. After having been made hydrophilic and inked up with greasy ink in the normal manner, the plate may be used for printing. Even the finest screen dots are excellently reproduced, and long runs may be achieved owing to the toughness and excellent adhesion of the layer.

Similar results are obtained when using 9-ethinyl-1-nitroanthraquinol(9) or 9-buteninyl-1-nitro-4-amino-anthraquinol(9).

EXAMPLES 10and 11

The activator according to the invention used in example 8 is replaced by 9-hexinyl-2-chloroanthraquinol-9or 9-hexinyl-anthra-quinol(-9), but otherwise the same procedure is followed. Instead of the activator used in example 9, there may be used 9($\omega$-methoxy-buteninyl)-2-chloroanthraquinol, and in this case the image elements of the layer are distinguished, after exposure, by an especially deep coloration, which facilitates observation of the developing process.

EXAMPLE 12

A support consisting of an electrolytically roughened aluminum foil is precoated with a 0.5 percent solution of polyvinyl phosphonic acid in a 90: 10 mixture of methyl glycol and water. After the foil has dried, it is coated with a solution containing 200 mg. of 9-hexinyl-2-chloroanthraquinol-9,2.5 g. of polymethyl methacrylate, 2.5 g. of trimethylolpropane triacrylate, 200 mg. of a low-molecular-weight polyglycol, and 3 mg. of inhibitor in 20 ml. of methylethyl ketone. After the foil has dried, it is provided with a top coating of polyvinyl alcohol and then exposed for 1.5 minutes to a xenon lamp under a 10-step grey wedge (UGRA-Keil, St. Gallen, Switzerland. The nonimage areas are dissolved away by immersing the foil for 1 minute in a 5 percent by weight solution of $Na_3PO_4 \cdot 12H_2O$ in highly diluted isopropanol, whereupon the foil is dried, hydrophilized, and inked with greasy ink. The grey wedge is blackened to the fourth full shade step.

EXAMPLE 13

Five hundred mg. of polyamide ("Ultramid" 1 c, of Badische Anilin-und Sodafabrik) are dissolved by prolonged stirring at room temperature in a mixture of 4 ml. of methanol and 1 mole of water. A solution of 200 mg. of ethylene bis-acrylamide and 40 mg. of 9-hexinyl-2-chloroanthraquinol in 4 ml. of methylglycol is added, and the solution thus produced is coated onto a support consisting of an electrolytically roughened aluminum foil. Top coating with polyvinyl alcohol and exposure are performed as described in example 9. For removal of the nonimage areas, the printing foil is rinsed with water and cautiously passed through a bath containing dilute methanol (85 percent). Upon leaving the bath, the imagewise-developed layer is very soft and vulnerable, but dries rapidly and becomes hard, so that after hydrophilization of the bared support with highly diluted phosphoric acid, an extremely resistant oleophilic relief plate is obtained which yields excellent prints.

EXAMPLE 14

Seven hundred mg. of a prepolymerized, but still organic-solvent soluble diallyl isophthalate resin sold by Ciba, Basel, Switzerland, under the trademark "Dapon" are dissolved in 8 ml. of commercial xylene and then mixed with a solution of 40 mg. of 9-hexinyl-2-chloro-anthraquinol-9in 2 ml. of methyl ethyl ketone. A support consisting of a mechanically roughened aluminum foil is coated with this solution, dried, and then exposed for 6 minutes under a line original to the light of a tube exposure device (equipped with 6 luminescent Philips TLA tubes, type 20 W/05, and a glass cover plate). Development is effected by immersion in commercial xylene. After the plate has dried, the bared support may be rendered hydrophilic by means of an aqueous solution containing 7 percent of gum arabic and 0.3 percent of hydrofluoboric acid. After inking with greasy ink, the plate may be used for printing.

EXAMPLE 15

A solution of 350 mg. of a styrene-maleic acid copolymer ("Lytron"), 200 mg. of a copolymer of α-methylstyrene and vinyl toluene ("Picotex"), 35 mg. of polyvinyl butyral ("Mowital"), 500 mg. of trimethylol propane triacrylate, 3 mg. of hydroquinone monomethylether, and 40 mg. of 9-phenethinyl-anthraquinol-9 in 7 ml. of methylethyl ketone, is evenly coated upon a cleaned zinc plate suitable for one-step etching, and the coated zinc plate is then exposed under a screen original and further treated as described in example 8. The developed plate may be subjected to an additional heating step (1 to 2 minutes at 100° C.) in order to harden the layer, although this is not necessary. The zinc plate is then deep-etched in a one-step etching apparatus by means of nitric acid containing an edge-protecting agent. The relief printing plate or block prepared in this manner is distinguished by an excellent adhesion of the layer, even in the areas of fine screen, and may be used for printing long runs, if necessary after residual layer portions have been removed by treatment with a solvent.

EXAMPLE 16

By means of a plate-whirler rotating at a speed of 120 revolutions per minute, the sensitizing solution described in example 15 containing, however, 200 mg. of 9-(ω-methoxy-buteninyl)-2-chloro-anthraquinol instead of 9-phenethinyl-anthraquinol-9, is coated in a darkened room onto a suitable flat support of electrically insulating material, e.g. "Pertinax" (a phenoplast laminate containing a layer of paper) which is superficially covered with a thin layer of metallic copper. The thus-sensitized support is dried, coated with a thin top coating of polyvinyl alcohol, and then exposed under a negative original showing an electrical wiring diagram, employing, e.g., a xenon lamp and an exposure time of 5 minutes. Subsequently, 5 nonimage areas are removed as already described by wiping briefly with a weakly alkaline developer, e.g. a 1 percent sodium phosphate solution. After rinsing and drying, the copper layer bared in the nonimage areas is etched away by bathing it in a 35 percent by weight solution of ferric chloride. In this manner, and if necessary after again rinsing with a solvent, a clear track of conductive metal is produced on the support which corresponds to the original and may be used as a printed circuit.

It will be obvious to those skilled in the art that many modifications may be made within the scope of the present invention without departing from the spirit thereof, and the invention includes all such modifications.

What is claimed is:

1. Light-sensitive material comprising a base material having a coating thereon comprising a binder and at least one photopolymerizable ethinyl quinole having the formula

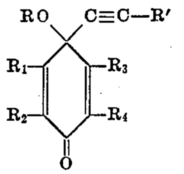

in which *R* is selected from the group consisting of hydrogen, alkyl having one –eight carbon atoms, aryl or acyl; *R″* is selected from the group consisting of hydrogen, alkyl having one –eight carbon atoms, vinyl, aryl, or

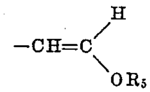

with $R_5$ being alkyl having one –eight carbon atoms; and $R_1$, $R_2$, $R_3$ and $R_4$ are selected from the group consisting of alkyl having one –eight carbon atoms and aryl, and $R_1$ and $R_2$ taken together or $R_3$ and $R_4$ taken together form a condensed aromatic ring group.

2. Light-sensitive material according to claim 1 in which the condensed aromatic ring group is substituted by at least one member selected from the group consisting of $NH_2$, $NO_2$, OH, $OR_6$ in which $R_6$ is alkyl having one –eight carbon atoms, or Cl.

3. Light-sensitive material according to claim 1 in which the coating also contains another photopolymerizable compound which is ethylenically unsaturated.

4. Light-sensitive material according to claim 1 in which the ethinyl quinole is 9(ω-methoxy-buteninyl)-anthraquinol-9.

5. Light-sensitive material according to claim 1 in which the ethinyl quinole is 9(ω-methoxy-buteninyl)-2-chloroanthraquinol-9.

6. Light-sensitive material according to claim 1 in which the ethinyl quinole is 9-phenethinyl-5-anthraquinol-9.

7. Light-sensitive material according to claim 1 in which the ethinyl quinole is 9-buteninyl-anthraquinol-9.

8. Light-sensitive material according to claim 1 in which the ethinyl quinole is 9-phenethinyl-2-chloroanthraquinol-9.

9. Light-sensitive material according to claim 1 in which the ethinyl quinole is 9-hexinyl-2-chloroanthraquinol-9.

10. A light-sensitive mixture comprising a binder and at least one photopolymerizable ethinyl quinole having the formula

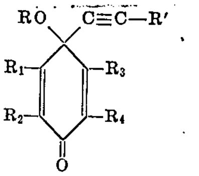

in which *R* is selected from the group consisting of hydrogen, alkyl having one –eight carbon atoms, aryl or acyl; *R′* is selected from the group consisting of hydrogen, alkyl having one –eight carbon atoms, vinyl, aryl, or

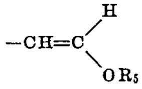

with $R_5$ being alkyl having one –eight carbon atoms; and $R_1$, $R_2$, $R_3$ and $R_4$ are selected from the group consisting of alkyl having one –eight carbon atoms and aryl, and $R_1$ and $R_2$ taken together or $R_3$ and $R_4$ taken together form a condensed aromatic ring group.

11. A light-sensitive mixture according to claim 10 in which the condensed aromatic ring group is substituted by at least one member selected from the group consisting of $NH_2$, $NO_2$, OH, $OR_6$ in which $R_6$ is alkyl having one –eight carbon atoms, or Cl.

12. A light-sensitive mixture according to claim 10 including another photopolymerizable compound which is ethylenically unsaturated.

13. A light-sensitive mixture according to claim 10 in which the ethinyl quinole is 9-(ω-methoxy-buteninyl)-anthraquinol-9.

14. A light-sensitive mixture according to claim 10 in which the ethinyl quinole is 9-(ω-methoxy-buteninyl)-2-chloroanthraquinol-9.

15. A light-sensitive mixture according to claim 10 in which the ethinyl quinole is 9-phenethinyl-5-amino-anthraquinol-9.

16. A light-sensitive mixture according to claim 10 in which the ethinyl quinole is 9-buteninyl-anthraquinol-9.

17. A light-sensitive mixture according to claim 10 in which the ethinyl quinole is 9-phenethinyl-2-chloroanthraquinol-9.

18. A light-sensitive mixture according to claim 10 in which the ethinyl quinole is 9-hexinyl-2-chloroanthraquinol-9.